(12) United States Patent
Halope et al.

(10) Patent No.: US 7,714,724 B2
(45) Date of Patent: *May 11, 2010

(54) RADIO FREQUENCY IDENTIFICATION DEVICE SUPPORT AND ITS MANUFACTURING METHOD

(75) Inventors: Christophe Halope, Cannes (FR); Anne Le Paih, Grenoble (FR)

(73) Assignee: ASK S.A., Valbonne-Sophia Antipolis (FR)

( * ) Notice: Subject to any disclaimer, the term of this patent is extended or adjusted under 35 U.S.C. 154(b) by 234 days.

This patent is subject to a terminal disclaimer.

(21) Appl. No.: 11/790,903

(22) Filed: Apr. 27, 2007

(65) Prior Publication Data
US 2007/0252705 A1  Nov. 1, 2007

(30) Foreign Application Priority Data
Apr. 28, 2006 (FR) .................................. 06 03860

(51) Int. Cl.
*G08B 13/14* (2006.01)
*H01L 21/00* (2006.01)
*H01L 21/31* (2006.01)
*H01L 21/469* (2006.01)

(52) U.S. Cl. ................. 340/572.1; 340/572.8; 438/108; 438/761

(58) Field of Classification Search ... 340/572.1–572.9; 438/156, 107, 108, 761–763
See application file for complete search history.

(56) References Cited

U.S. PATENT DOCUMENTS

| | | | |
|---|---|---|---|
| 5,528,222 A | 6/1996 | Moskowitz et al. | 340/572 |
| 5,786,626 A | 7/1998 | Brady et al. | 257/673 |
| 7,341,181 B2 * | 3/2008 | Bonalle et al. | 235/380 |
| 2003/0136503 A1 | 7/2003 | Green et al. | 156/264 |
| 2003/0153120 A1 | 8/2003 | Halope | 438/106 |
| 2003/0168514 A1 | 9/2003 | Rancien et al. | 235/492 |
| 2004/0266165 A1 * | 12/2004 | Utsunomiya | 438/616 |
| 2005/0035590 A1 * | 2/2005 | Jones et al. | 283/74 |
| 2005/0275540 A1 | 12/2005 | Halope et al. | 340/572.8 |
| 2006/0176181 A1 | 8/2006 | Halope | 340/572.8 |
| 2006/0246738 A1 * | 11/2006 | Isobe et al. | 438/769 |
| 2007/0029391 A1 | 2/2007 | Halope et al. | 235/492 |
| 2007/0158315 A1 * | 7/2007 | Tanaka et al. | 219/121.8 |
| 2008/0125531 A1 * | 5/2008 | Sugawara | 524/384 |

* cited by examiner

*Primary Examiner*—Jennifer Mehmood
(74) *Attorney, Agent, or Firm*—James C. Lydon

(57) ABSTRACT

A radio frequency identification device support (2) featuring an antenna (12) screen-printed on a support (20) and a chip (10) connected to the connection terminals (17 and 19) of the antenna. According to a main characteristic of the invention, a thermoplastic layer (22) and a top layer of synthetic paper (24) are laminated on the antenna support (20) so that the antenna and the chip are trapped in the thermoplastic and the three layers (20, 22, and 24) cannot be separated and so that the device is resistant to water and humid environments.

17 Claims, 4 Drawing Sheets

RADIO FREQUENCY IDENTIFICATION DEVICE SUPPORT AND ITS MANUFACTURING METHOD

TECHNICAL FIELD

This invention concerns radio frequency identification devices designed to be built into objects such as security documents and specifically concerns a radio frequency identification device support and its manufacturing method.

BACKGROUND ART

Contactless Radiofrequency Identification Devices (RFIDs) are increasingly used for identification of persons moving about in controlled access zones or transiting from one zone to another. A contactless RFID is a device made up of an antenna and a chip connected to the terminals of the antenna. The chip is usually not powered and receives its energy by an electromagnetic coupling between the antenna of the reader and the antenna of the RFID, information is exchanged between the RFID and the reader and particularly information stored in the chip that relates to the identification of the holder of the object on which the RFID is located and to his/her authorization to enter into a controlled access zone.

In this manner, passports can incorporate RFIDs to identify the passport holder. The chip memory contains information such as the identity of the passport holder, his/her country of origin, his/her nationality, visas of different countries visited, dates of entry, restrictions of movements, biometric elements, etc. The RFID device is generally incorporated into the bottom cover board of the passport. An antenna is then screen-printed using ink loaded with particles of silver on the reinforced bottom cover board of the passport cover. The chip is then connected by gluing to the connection terminals of the antenna. Then, the flyleaf of the quire of passport pages is laminated to the back of the reinforced top cover board. This embodiment has a drawback, as it is not waterproof and particularly cannot resist the passage of the passport through a washing machine. If the paper on which the antenna is screen-printed is not water resistant, the latter absorbs water and swells up, which causes fractures of the antenna and therefore a rupture of the electrical connection between the antenna and the chip.

This problem can be overcome by the use of an RFID device made up of a plastic "inlay". In this case, the inlay includes the antenna and the chip, the whole assembly being embedded in plastic layers. The inlay is then bonded between the flyleaf and the passport cover. One of the drawbacks of such an RFID device is the difference in material between the inlay and the passport. The latter being made of plastic, the bonding between the two is not optimal.

Using an RFID support with at least one of its external sides made of paper allows this disadvantage to be overcome.

But the problem of using paper depends on its ability to delaminate over its thickness in case of an attempt of pulling it out. The delamination can also occur on the edges of the support after a certain period of use, which is a definite disadvantage when the support is intended to be used in a secure document whose lifespan must extend over several years.

Furthermore, a secure document such as a passport implies that the passport pages and consequently the cover supporting the RFID device will be subjected to impacts due to stamping or affixing visas, which exposes the electronic chip to a significant risk of destruction.

SUMMARY OF THE INVENTION

This is why the purpose of this invention is to counter these drawbacks by offering a radio frequency identification device support that has a good affinity to gluing with paper and that does not delaminate over the thickness and moreover that protects the RFID device from risks of destruction caused by impacts or shocks.

Another object of the invention is to supply an identity booklet such as a passport integrating such a radio frequency identification device.

The purpose of the invention is thus a radio frequency identification device support featuring an antenna screen-printed on a support and a chip connected to the connection terminals of the antenna. According to a main characteristic of the invention, a thermoplastic layer and a top layer of synthetic paper are laminated on the antenna support in order to obtain an RFID device resistant to water and humid environments so that the antenna and the chip are trapped in the thermoplastic and so that the three layers cannot be separated.

Another purpose of the invention relates to an identity booklet, which includes a radio frequency identification device (RFID) support according to the first purpose of the invention.

Finally, another purpose of the invention concerns a manufacturing method of a radio frequency identification device (RFID) support, the device featuring an antenna and a chip connected to the antenna, the method including the following steps:
 screen printing an antenna featuring contacts on a support,
 placing adhesive dielectric material between the contacts of the antenna,
 positioning the chip on the support so that the chip's contacts are located opposite the antenna's contacts,
 connecting the chip to the antenna's contacts by exerting pressure on the chip,
 placing on the support a thermoplastic layer and a top layer of a material that does not melt such as synthetic paper, the top layer being provided with a cavity at the location of the chip,
 laminating together the support, the thermoplastic layer and the top layer
 in order to obtain an RFID device resistant to water and humid environments and so that the antenna and the chip are trapped in the thermoplastic and so that the three layers cannot be separated.

BRIEF DESCRIPTION OF THE DRAWINGS

The purposes, objects and characteristics of the invention will become more apparent from the following description when taken in conjunction with the accompanying drawings in which.

DESCRIPTION OF THE INVENTION

Figure 1:
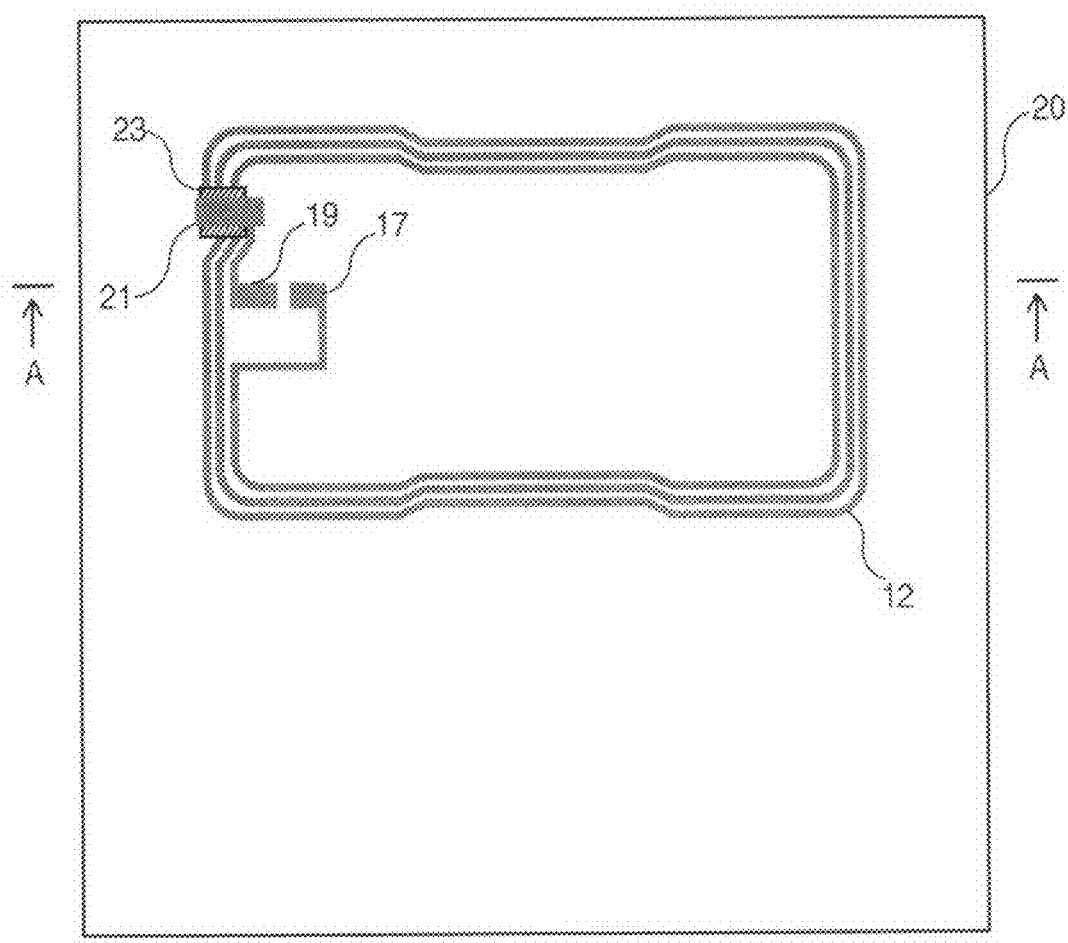
FIG. 1 represents the front view of the antenna support to which the RFID device is bonded.

With reference to FIG. 1, a first layer 20 is used as a support for the antenna and its size corresponds to that of a closed passport, that is to say approximately 88×125 mm. The material of the layer 20 is a material that does not melt and thus does not deform irreversibly when the temperature increases. The material of layer 20 is preferably a material whose cohesion is not modified much during a hot lamination operation which consists in exerting pressure. The antenna 12 that makes up an essential element of the RFID device consists of one or more turns screen printed with an electrically conductive polymer ink, loaded with conductive elements such as silver, copper or carbon. Each end of the antenna is connected to one of the two contacts 17 and 19 of the antenna which are also screen-printed. The turns are interconnected by an electric bridge 21 most commonly referred to as the "cross-over". An insulating strip 23 of dielectric ink is screen printed between the cross-over and some of the turns of the antenna 12 to allow the turns of the antenna to overlap without electrical contact. According to a preferred embodiment of the invention, the antenna is screen printed on this material in several steps. The first step consists in screen printing the turns of the antenna 12 and the two contacts 17 and 19 of the antenna. The second step consists in screen printing an insulating strip 23 to allow the turns of the antenna 12 to overlap. The third step consists in screen printing the electric bridge 21 which connects the outermost turn of the antenna 12 of the group of turns.

The next step consists in connecting the chip on the contacts of the antenna 12. An adhesive dielectric material is placed on the antenna support 20, between the two contacts 17 and 19 of the antenna 12. This adhesive material is applied before the chip is placed on the support, unlike the traditional "Flip Chip" process in which the adhesive is applied once the chip is connected. This step is thus much easier to perform and output is much better. The adhesive used is preferably epoxy resin that cross-links at 150° C. It is also possible to use cyanoacrylate type glue, which polymerises at ambient temperature.

Figure 2:
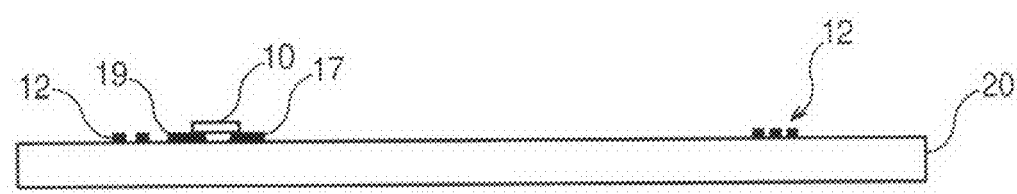
FIG. 2 represents a cross-section of the antenna support to which the RFID device is bonded.

Once the adhesive material has been applied, the chip 10 is positioned on the antenna support so that the chip's contacts 17 and 19 are opposite the antenna's contacts as shown in cross-section on FIG. 2. Pressure is then exerted on the chip 10 so that the non-deformable contacts of the chip sink into the contacts 17 and 19 of the antenna 12. Under the exerted pressure, the antenna's contacts are then deformed. The antenna's support 20 is compressed under the pressure exerted on the chip and can also get deformed. It is then noted that the contact surface between the chip's contacts and the contacts of the antenna 12 is maximum, even when the pressure is not being exerted any longer. The chip's contacts are preferably conical in shape. As a result of the pressure, the adhesive dielectric material 20 spreads and covers the entire surface of the chip between the contacts and penetrates into the depth of the antenna support. It thus enables the mechanical assembly between the chip 10 and the antenna support 20—and thereby the electric contact between the chip and the antenna—to be reinforced. The adhesive dielectric material used is preferably fluid and has a strong penetrating power. The support is then passed through an oven in order to cross-link the glue.

Once the chip 10 is fixed to the support, the next step consists in laminating together the RFID device and the various layers that will make up the RFID device support. The embodiment described is adapted so that the RFID device support obtained can be built into an identity booklet such as a passport.

Figure 3:
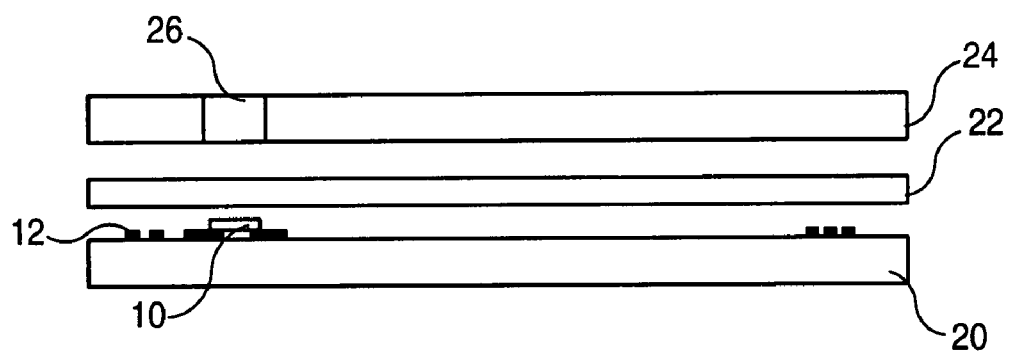
FIG. 3 represents a cross-section of the various layers which make up the RFID device support.

According to the preferred embodiment of the invention, the various layers that make up the RFID device support as shown in FIG. 3 comprise the antenna support 20, a thermoplastic layer 22 and a top layer 24.

The device is made by laminating the various layers once the chip is fixed on the antenna support 20. A first layer of thermoplastic 22 is placed on the antenna support 20. The thickness of the thermoplastic layer is between 40 and 80 μm and is preferably in the order of 50 μm. The top layer 24 features a cavity 26 located in such a way that it overlaps the chip and whose surface area is greater than that of the chip so that the pressure exerted during the lamination step does not reach the chip as the pressure is exerted uniformly over the entire surface of the sheet but is not exerted at the location of the cavity placed above the location of the chip. The cavity 26 is preferably circular with a diameter in the order of 6 mm.

Figure 4:
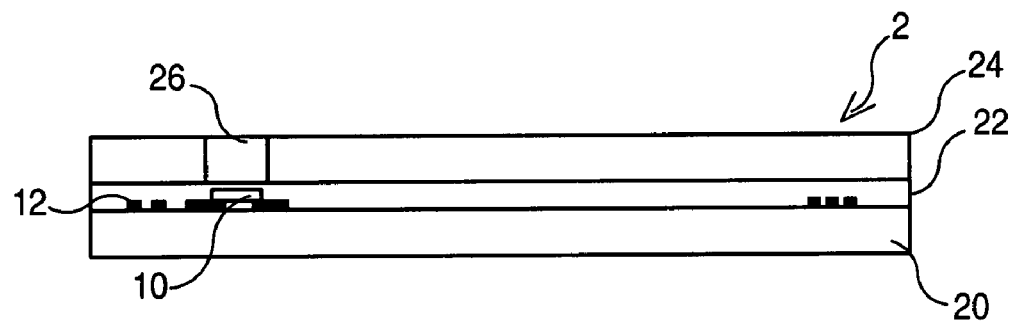
FIG. 4 represents a cross-section of the RFID device support according to the invention.

The lamination step consists in welding by hot press moulding the layers 20, 22, 24 in order to obtain an RFID device support 2 as shown in FIG. 4. The temperature and the pressure reached are in the order of 160° C. and 200 bar respectively. As previously stated, the antenna support 20 is preferably made of a material that does not melt and thus does not deform irreversibly when the temperature increases up to 160° C. Furthermore, this material cannot delaminate over time, whether or not it is intentional. The support 20 is preferably made of synthetic paper consisting of one single unoriented layer of a polymer such as polyethylene or polypropylene loaded with minerals between 40 and 80%. Its composition gives it a low density in the order of 0.57 g/cm$^3$ thanks to its microporous network and its thickness is in the order of 180 μm. The thickness may be less without deviating from the scope of the invention. Even though the thermoplastic layer 22, directly in contact with the chip, is not pierced with a cavity at the location of the chip, the pressure exerted during lamination is not transmitted to the chip to the extent that it gets damaged.

At the temperature and pressure values used during the lamination step, the thermoplastic comprising the layer 22 becomes soft and liquefies while being trapped between the two respective layers of the antenna support 20 and the top layer 24. During the lamination, the antenna support provides the device consisting of the antenna 10 and the chip 12 with a stiffness and a cohesion that prevent any electrical rupture since the material of the layer forming the antenna support resists without getting deformed and especially without creeping at temperatures and pressure of the lamination step. The stiffened thermoplastic layer 22 has trapped the raised designs of the antenna support 20 so that the antenna 10 and the chip 12 are embedded in the thermoplastic 22. A cross-section of the various layers 20, 22, 24 will show that the antenna 10 and the chip 12 are moulded in the thermoplastic 22, the latter having covered the chip at the location of the cavity 26. In this manner, in a humid environment, it is the thermoplastic layer that provides the RFID device support with a stiffness and cohesion that prevent any electrical rupture. The thermoplastic enables the two layers 20 and 24 to be welded together and plays the role of a glue between these two layers.

The top layer 24 with a thickness of 180 µm is preferably of the same material as the antenna support 20, therefore of synthetic paper as defined above. The RFID device support 2 made in this manner by laminating layers 20, 22, 24 and shown in cross-section on FIG. 3 has a thickness of about 350 µm.

The flexibility of the RFID device support 2 obtained depends on the thickness of the thermoplastic layer 22 used. The more the thickness of the thermoplastic layer is reduced, the more the RFID device support is flexible.

Figure 5:
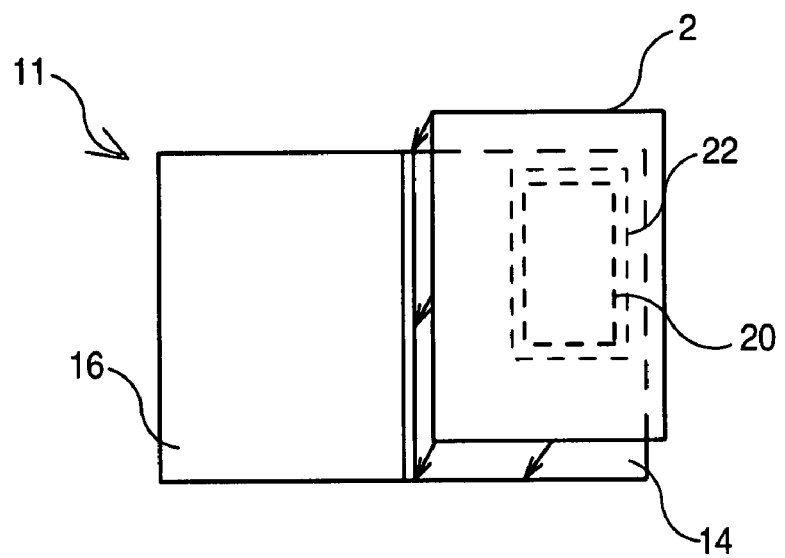
FIG. 5 represents the installation of the RFID device support on the cover of an identity booklet.

According to FIG. 5, the RFID device support 2 is glued onto one of the two cover boards 11 of the identity booklet, preferably on the bottom cover board 14 but could also be glued onto the top cover board 16. The side of the RFID device support opposite the antenna support and the chip, therefore layer 24, is glued on the cover board of the identity booklet in order to protect the chip as much as possible from impacts that could occur inside the booklet. More generally, the RFID device support 2 is glued using a glue which, once dry, is insoluble in water.

Figure 6:
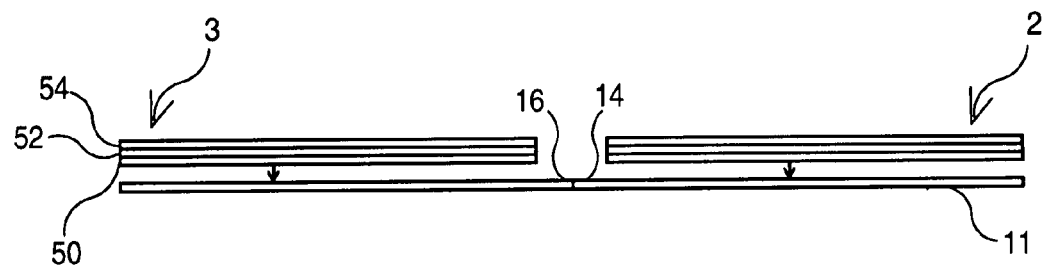
FIG. 6 represents a cross-section of the cover of the booklet and the installation of the RFID device support.

In order to maintain the same thickness over the entire cover of the booklet, it is advantageous to affix on the other cover board of the booklet, the one that does not bear the RFID device support, one or more layers forming a support 3 as shown in FIG. 6 and whose total thickness is equivalent to the thickness of the RFID device support 2. The support 3 is therefore preferably of a size identical to that of the device support 2. For example and according to FIG. 6, it is possible to manufacture a support 3 without RFID device consisting of a single layer of synthetic paper 50 or, alternately, to laminate together a layer of synthetic paper, a layer of thermoplastic and a layer of synthetic paper, the single layer or the set of layers being of the same total thickness as all of the layers 20, 22, and 24. The support 3 thus manufactured is then glued to the second cover board 11 of the booklet, while leaving a free strip of the cover at the location of the booklet's joint.

Figure 7:
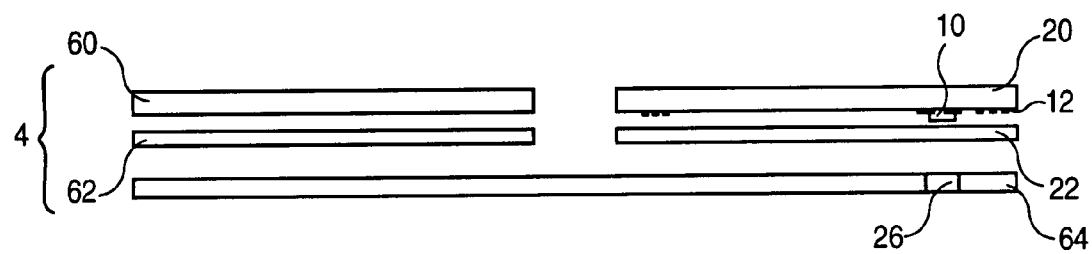
FIG. 7 represents a cross-section of the RFID device support according to a variant of the invention.

According to a variant of the invention, the supports 2 and 3 can be manufactured together in order to be integral with one another by means of a single top layer of synthetic paper 64 to form an RFID device support 4 as shown in FIG. 7. A first layer of thermoplastic 22 is placed on the antenna support 20 whose thickness is between 40 and 80 µm but preferably in the order of 50 µm. A second thermoplastic layer 62 is also placed on a second layer 60 of synthetic paper. The layers 20, 22, 60, and 62 having the same size corresponding in length to the size of a closed identity booklet but whose width is slightly less than the width of a closed identity booklet. A top layer 64 is placed on the layers 22 and 62 so as to leave a space between them. The layer 64 features a cavity 26 located in such a way that it overlaps the chip and whose surface area is greater than that of the chip so that the pressure exerted during the lamination step does not reach the chip as the pressure is exerted uniformly over the entire surface of the sheet but is not exerted at the location of the cavity placed above the location of the chip. The cavity 26 is preferably circular with a diameter in the order of 6 mm. The lamination step then consists in welding by hot press moulding the various layers 20, 22, 60, 62, and 64.

Figure 8:
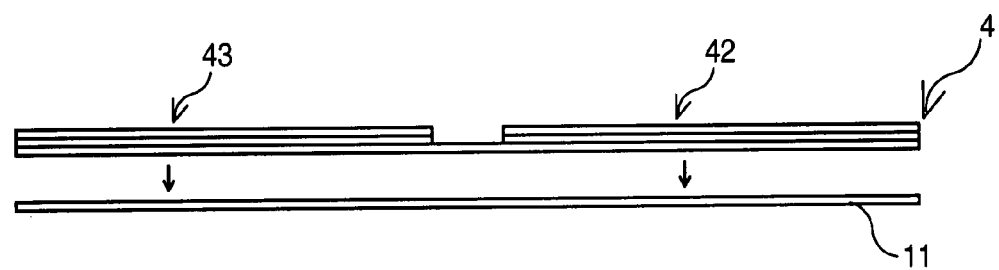
FIG. 8 represents a cross-section of the cover of the booklet and the installation of the RFID device support according to the variant.

The support 4 acting as an RFID device support for the variant of the invention is shown in cross-section in FIG. 8. Having a size equal to that of the open identity booklet, it includes two thick parts 42 and 43, the part 42 containing the RFID device, the two parts overlapping the cover 11 boards 14 and 16 of the booklet, and a thinner part designed to overlap the identity booklet's joint.

However, the RFID device support 2 as described can also be integrated into the booklet by bonding one of its sides, preferably on the antenna support side, on any type of object such as clothes, books, paper documents, packaging, cartons, etc.

Figure 9:
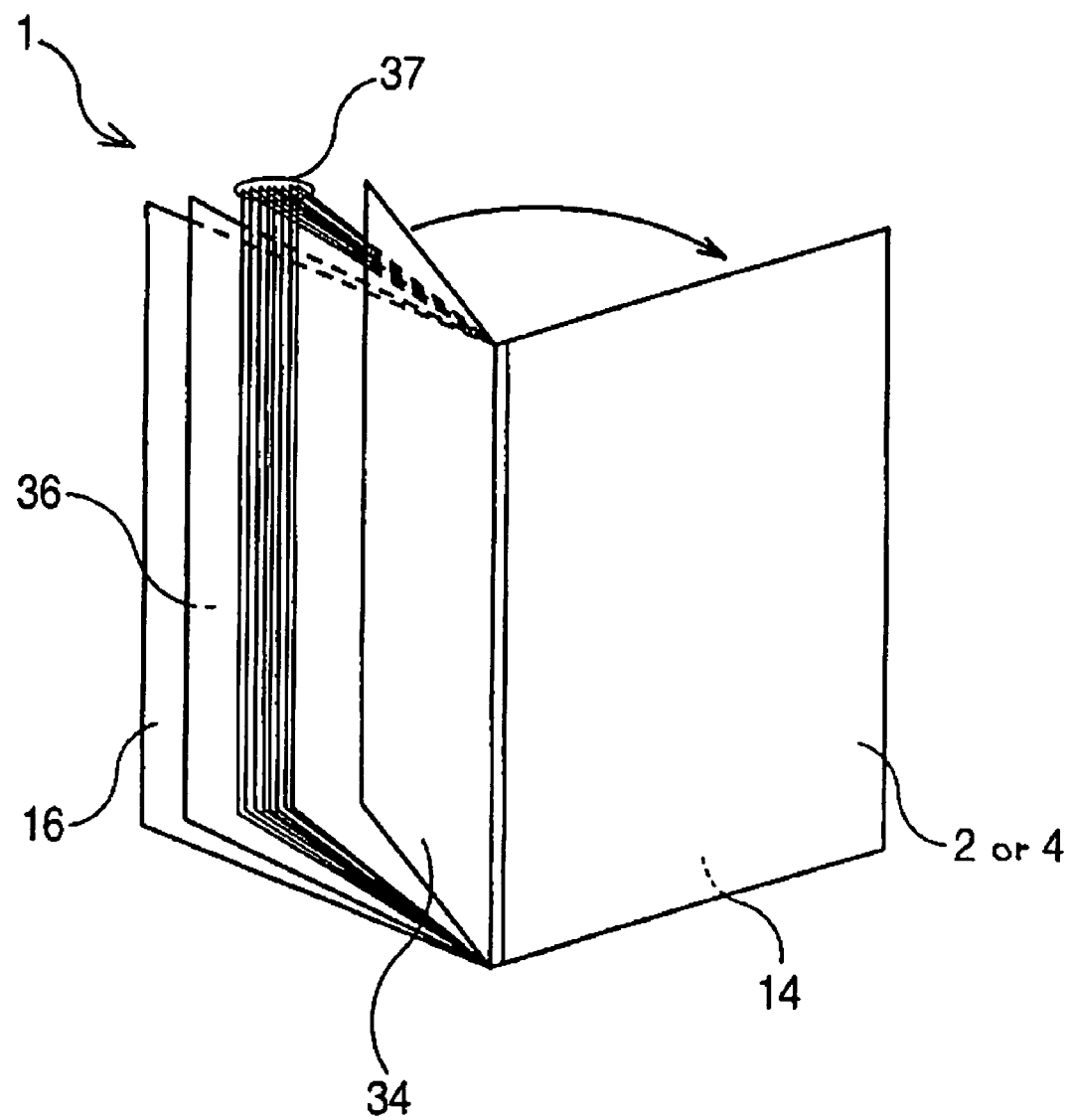
FIG. 9 represents the installation of the quire of inside pages of the booklet.

The identity booklet 1 represented diagrammatically in FIG. 9 is completely formed by installing the quire of inside pages 37. The manufacturing method consists in making the quire of inside pages by using a secure thread to connect them to one another. In the manufacture of a traditional passport, the flyleaves are laminated on the cover boards, the flyleaf 36 being laminated with the top cover board 16 while the bottom flyleaf 34 is laminated with the bottom cover board 14. In this manner, according to the invention, the back of the bottom flyleaf 34 of the quire of pages of the identity booklet is pasted then pressed against the RFID device support 2 glued on the bottom cover board of the booklet's cover, thus on the side of the antenna support 20 layer. Or alternately, according to the variant described earlier, the back of the bottom flyleaf 34 of the quire of pages of the identity booklet is pasted then pressed against the part 42 of the support 4, the part 42 being the one containing the chip and the antenna whereas the front of the flyleaf 36 is pasted then pressed against the part 43 of the support 4. The glue used is preferably a glue that, once dry, becomes insoluble in water.

The use of synthetic paper in making the RFID device support is an indisputable advantage of the invention.

On the one hand, using synthetic paper simplifies the lamination operation carried out at temperatures in the order of 160° C., as it is stable at these temperatures contrary to thermoplastic materials such as PVC or PETG. The RFID device support 2 or 4 made according to the invention has synthetic paper on both its sides, which simplifies bonding and optimises its integration on the identity booklet as the bondings are carried out paper against paper. As a result, the synthetic paper has a low density due to its microporous structure, which provides it with a good affinity to gluing with paper contrary to traditional plastic materials such as PVC or PET. The identity booklet thus obtained has the advantage of a great cohesion between all of the parts that make it up and particularly between the RFID device support and the identity booklet itself. The glue penetrates deeply into the synthetic paper as it penetrates into the paper and thus particularly in the paper of which the cover of the booklet is made, which makes it impossible to remove the layers 20, 22, and 24 from one another and which makes the three layers making up the support inseparable.

The thermoplastic material used for the layers 22 and 52 is preferably polyvinyl chloride (PVC), but could also be polyester (PET, PETG), polypropylene (PP), polycarbonate (PC) or acrylonitrile-butadiene-styrene (ABS).

Furthermore, deliberate pulling out of the RFID device support built into the booklet is not possible as the synthetic paper does not delaminate over the thickness.

During the lamination or thereafter, the outside of the booklet's cover may be subjected to a plate having special raised designs to produce a particular grain on the cover to make the identity booklet tamper-resistant.

Advantageously, the RFID device support and the identity booklet according to the invention may be subjected to a washing cycle in a washing machine without the electrical connection between the chip and the antenna being altered, thus maintaining for these items the ability to be read by electromagnetic coupling with a reader provided for this purpose.

The RFID device support and the RFID device may also be made in ISO format of smart cards so that they can be used to manufacture contactless smart cards. The two outer layers of synthetic paper and the thermoplastic layer are in the ISO format of smart cards and the antenna is also adapted so that the size of turns is slightly less than the ISO format of smart cards. In this case, an additional step in the manufacturing method described above consists in customising the card by printing on one or both faces of the card.

The invention claimed is:

1. A radio frequency identification device, comprising
an antenna screen printed on an antenna support, and
a chip connected to connection terminals of said antenna,
wherein a thermoplastic layer and a top layer of synthetic paper are laminated on said antenna support in such a way that said antenna and said chip are trapped in the thermoplastic layer and such that the thermoplastic layer, the antenna support, and the top layer of synthetic paper are inseparable,
wherein said synthetic paper consist of a single unoriented layer of polymer which contains 40 to 80% of a mineral.

2. The device of claim 1, wherein said top layer includes a cavity located such that it overlaps said chip.

3. The device of claim 1, wherein said chip is glued on said antenna support using an adhesive dielectric material such that contacts of the chip are located opposite the connection terminals of the antenna.

4. The device of claim 3, wherein said adhesive material is an epoxy resin that cross-links at 150° C.

5. The device of claim 1, wherein the thermoplastic layer and a top layer of synthetic paper are laminated on said antenna support at values of temperature and pressure in the order of 160° C. and 200 bar.

6. The device of claim 1, wherein the synthetic paper of said top layer does not deform when the temperature increases.

7. The device of claim 1, wherein said thermoplastic layer has a thickness of 50 μm.

8. An identity booklet, comprising the radio frequency identification device of claim 1, in combination with a booklet comprising a cover having a cover board and fly leaf, wherein said device is integrated between a cover board of the identity booklet's cover and a flyleaf of the identity booklet located opposite said cover board.

9. The identity booklet of claim 8, wherein a support having a size equal to that of the device is integrated between the cover board of the booklet's cover and the flyleaf of the booklet located opposite said cover board between which the device has not been integrated.

10. An identity booklet comprising the radio frequency identification device of claim 1, wherein said device has a size equal to that of the identity booklet when open and includes two thick parts, one of which contains the device, the two thick parts overlapping cover boards of the identity booklet and a thinner part designed to overlap a joint of the identity booklet.

11. The identity booklet of claim 8, wherein said device is glued inside identity booklet using a glue which, once dry, is insoluble in water.

12. A method for manufacturing a radio frequency identification device, the device comprising an antenna and a chip connected to the antenna, said method comprising the following steps:
screen printing an antenna having contacts onto an antenna support,
placing adhesive dielectric material between said contacts of the antenna,
positioning the chip on said antenna support so that contacts of said chip are located opposite said contacts of said antenna,
connecting the chip to said contacts of said antenna by exerting pressure on the chip,
placing on said support a thermoplastic layer and a top layer of synthetic paper, the top layer being provided with a cavity at the location of the chip,
laminating said antenna support, the thermoplastic layer and the top layer together to obtain a radio frequency identification device which is resistant to water and to humid environments,
wherein said synthetic paper consists of a single unoriented layer of polymer which contains 40 to 80% of a mineral.

13. A method for manufacturing a radio frequency identification device, the device comprising an antenna and a chip connected to the antenna, said method comprising the following steps:
screen printing an antenna having contacts on an antenna support,
placing adhesive dielectric material between said contacts of the antenna,
positioning the chip on said antenna support so that contacts of said chip are located opposite said contacts of said antenna,
connecting the chip to said contacts of said antenna by exerting pressure on the chip,
placing on said antenna support a first thermoplastic layer,
placing a second thermoplastic layer on a layer of synthetic paper,
placing a top layer of a material that does not melt on the first and second thermoplastic layers, the top layer being provided with a cavity at the location of the chip,
laminating together said antenna support, the thermoplastic layers, the layer of synthetic paper and the top layer to obtain a radio frequency identification device made up of two parts of identical dimension, one of these parts containing the radio frequency identification device, and a thinner part located between the two parts of identical dimension,
wherein said synthetic paper consists of a single unoriented layer of polymer which contains 40 to 80% of a mineral.

14. The manufacturing method of claim 12, wherein said device is integrated between a first cover board of an identity booklet's cover and a flyleaf of a quire of inside pages, said method further comprising the following steps after the lamination step:
gluing onto said first cover board of the identity booklet's cover the device by gluing the opposite side of the antenna support,
gluing onto the second cover board of the booklet's cover a layer of a material that does not creep and whose thickness is equivalent to that of the device support,
installing the quire of inside pages,
gluing a front of the flyleaf against said device, thus against the antenna support.

15. The manufacturing method of claim 13, said device being integrated between the cover boards of an identity booklet's cover and flyleaves, said method further comprising the following steps after the lamination step:
gluing the device on said cover boards of the identity booklet by gluing the opposite side to the antenna support such that the thinner part of the device superimposes on a joint of the identity booklet,
installing the quire of inside pages,
gluing the flyleaf against said device; to this end, the back of the bottom flyleaf of the quire of pages of the identity booklet is pasted then pressed against the part of the device which contains the chip and the antenna whereas the front of the flyleaf is pasted then pressed against the other part of the device.

16. A smart card comprising the device of claim 1, and conforming to the ISO format for smart cards.

17. The smart card of claim 16, wherein at least one of the sides of the card is customized.

* * * * *